(12) United States Patent
Plucknett (10) Patent No.: US 7,954,247 B1
(45) Date of Patent: Jun. 7, 2011

(54) SELF-ORIENTING PLATFORM

(76) Inventor: Bruce West Plucknett, Sadieville, KY (US)

(*) Notice: Subject to any disclaimer, the term of this patent is extended or adjusted under 35 U.S.C. 154(b) by 0 days.

(21) Appl. No.: 12/714,305

(22) Filed: Feb. 26, 2010

(51) Int. Cl.
G01C 17/34 (2006.01)
G01C 17/04 (2006.01)
G04B 49/02 (2006.01)

(52) U.S. Cl. ........................... 33/271; 33/355 R (58) Field of Classification Search .............. 33/268, 33/269, 270, 271, 355 R
See application file for complete search history.

(56) References Cited

U.S. PATENT DOCUMENTS

| | | | | |
|---|---|---|---|---|
| 2,532,402 A | * | 12/1950 | Herbold | 33/268 |
| 2,575,166 A | * | 11/1951 | Powell et al. | 33/268 |
| 2,594,600 A | | 4/1952 | Upton | |
| 4,028,813 A | | 6/1977 | Eldridge | |
| 4,103,429 A | | 8/1978 | Wagoner | |
| 4,645,354 A | | 2/1987 | Mercer | |
| 4,890,269 A | | 12/1989 | Buckner et al. | |
| 5,233,759 A | * | 8/1993 | Gloor et al. | 33/355 R |
| 5,396,709 A | * | 3/1995 | Swan, Jr. | 33/268 |
| 5,459,931 A | * | 10/1995 | Waltho | 33/271 |
| 6,145,209 A | * | 11/2000 | Chang | 33/348 |
| 6,308,427 B1 | * | 10/2001 | Kaufmann | 33/270 |
| 7,114,262 B2 | * | 10/2006 | Andrewes | 33/270 |
| 2005/0120570 A1 | * | 6/2005 | Bastian | 33/268 |

FOREIGN PATENT DOCUMENTS

| | | |
|---|---|---|
| SI | SI0020129 C | 6/2000 |
| WO | WO 93/05362 | 3/1993 |
| WO | WO 2009/023990 | 2/2009 |

OTHER PUBLICATIONS

J.A.B., "Epact Unpacked: A Self-Oriented Crucifix Dial," Sphaera issue No. 11, article 6, Spring, 2000.
DeVries, F., "Re: self-orienting sundial," Sep. 4, 1999, downloaded Feb. 26, 2010 from www.mail-archive.com/sundial©uni.koeln.de/msg01945.html.
Hooijenga, R., Bulletin 07.1 nr. 93, English Summary, Jan. 2007, downloaded Mar. 29, 2009 from www.de-zonnewijzerkring.nl/summaries/home-summaries-2007-1-htm.

(Continued)

*Primary Examiner* — G. Bradley Bennett
(74) *Attorney, Agent, or Firm* — ewinner & associates, pllc; Eileen P. Winner (57) ABSTRACT

A self-orienting platform device is provided having a platform that is rotatably adjustably attached to a body. The device is provided with adjustable weights to ensure even rotation. The attachment between the platform and the body is such that when the body rotates, the platform rotates with it, but the attachment can be adjusted such that the user can rotate the platform relative to the body when desired. The device comprises a magnet with an attached magnetic north indicator, and can be set by rotating the platform relative to the body so that when the magnet points to magnetic north, the magnetic north indicator points to a selected marking or other feature on the platform. The platform can be rotated with respect to the body to account for the difference between magnetic and true north, so that the selected marker is aligned with true north. The device can be used as a self-orienting sundial to tell the time of day by the sun, and because it is portable and does not have to be reset for different locations (within the same general latitude and longitude and time period), the sundial can be moved from place to place and used as a teaching aid in classrooms, and an interactive decorative object in homes and gardens.

20 Claims, 6 Drawing Sheets

OTHER PUBLICATIONS

Hooijenga, R. Bulletin 00.1nr. 72, English Summary, Jan. 2002, downloaded Oct. 04, 2009 from http://www.de-zonnewijzerkring.nl/summaries/home-summaries-2000-1.htm.

Hristov, V., web posting downloaded from http://www.math.bas.bg/complan/valhrist/sdboxarb.txt Oct. 4, 2009.

Sabanski, Sundial Primer Index, downloaded from http://www.mysundial.ca/tsp/gnomonless_equatorial_sundial.html Feb. 26, 2010.

* cited by examiner

SELF-ORIENTING PLATFORM

SUMMARY

A self-orienting platform device is provided that comprises a base; a body rotatably attached to the base; a magnet fixedly attached to the body; a magnetic north indicator fixedly attached to the magnet; a platform positioned on the body (centered above or offset from the center of gravity of the body) such that it can be adjusted either to rotate with the body or to rotate with respect to the body; and one or more weights adjustably attached to the body to allow the center of gravity of the body and attached components that rotate with it to be adjusted such that the body can be rotated horizontally with respect to the base. The magnetic north indicator is fixedly positioned with respect to the magnets such that it indicates the north-south alignment of the magnets, and the platform is rotatably positioned with respect to the magnetic north indicator such that a reference point on the platform can be aligned with the magnetic north indicator.

In embodiments, the platform also comprises a sundial face painted on or positioned on the platform, and in further embodiments, a gnomon can be fixedly attached to the sundial face. Sundials known to the art have a wide variety of configurations. Any sundial design can be used with the rotating platform device hereof, as long as its size and weight is appropriate to the other components.

The self-orienting platform device can be placed outdoors or indoors, and can be made light enough and small enough to be moved freely from place to place. The device can be adjusted such that it automatically resets itself so that whenever a selected reference marker on the platform is moved out of orientation to true north, it will automatically reorient itself to be lined up with true north. Also, at any time, the user can cause the device to reorient to true north by giving the body a spin and allowing it to come to rest. Thus, the self-orienting platform device can conveniently be used in a classroom to illustrate basic physical principles such as earth's rotation and orbit, inertia/friction, balance (center of gravity), leverage, and the relationship of magnetic north to true north. The sundial embodiment is also useful as an educational device to illustrate such physical principles and in addition to illustrate the relationship of time measurement to these principles. The components of the platform device can be provided unassembled as an educational kit. The device can also serve as an interactive decorative object in homes and gardens.

Figure 6:
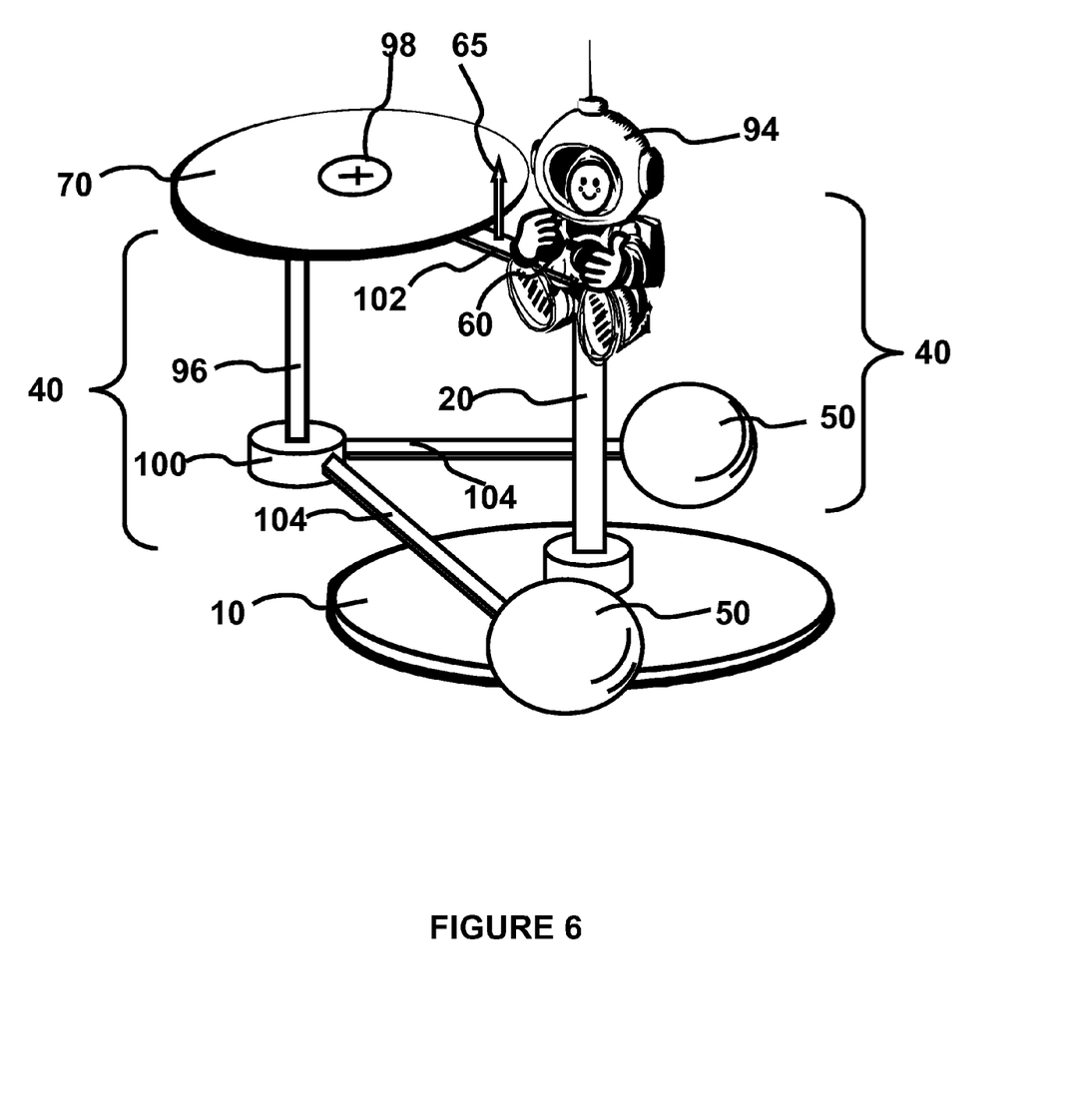
FIG. 6 is a perspective view of an embodiment of the self-orienting platform device in which the body and associated components are provided in a fanciful configuration including a model of a passenger in the form of a spaceman.

In embodiments the components can be sold as a kit with modular body components, as illustrated in FIG. 6, leaving the user free to construct unique, artistic body designs. For example, the spaceman figure shown in FIG. 6 can be replaced with any other object, the weights can be made in different shapes, and the positions of these components can be changed, so long as the center of gravity of the body and attached components that rotate with it remains such that horizontal rotation is maintained.

In other embodiments, the self-orienting platform serves to support and orient a weathervane. It can also be used to support a map and acts as a compass for orienting the map with respect to the platform.

The base of the self-orienting platform device can be any size, shape, or material, and can be hollow or solid, so long as it is strong and heavy enough to support the moving parts as they rotate and allows for the body to be rotatably attached to it. For example, the base can be a rock, a block of wood, a cross-sectional slice of raw wood, a piece of driftwood, a sculpture or any other suitable object.

The rotatable attachment of the body to the base can be direct or indirect. For example, the base and the body can be separated by a pedestal that is either fixedly attached to the base and rotatably attached to the body, or is rotatably attached to the base and fixedly attached to the body. Any means known to the art can be used to provide the rotatable attachment between the body and the base (or pedestal). A pivot fixedly attached to one of these components and rotatably attached to the other can be used. In embodiments, the pivot is made of a hard, nonmagnetic material that mates with and pivots on a hard nonmagnetic surface. Nonmagnetic materials such as metals, plastics, wood and other nonmagnetic materials that are hard enough to retain their shape during use can be used. Other means for providing a rotatable attachment include ball and socket joints, ball bearing assemblies, and others known to the art, in which the point of contact between the pivot and fixed component has very low friction.

The body, similarly, can be any size, shape, and nonmagnetic material, and can be hollow or solid, so long as it is strong enough to support and be attached to upper components of the platform device and sized and shaped such that it can be rotatably attached to the base. The body, along with its attached components that rotate with it, is advantageously balanced so that it rotates horizontally and evenly about the center of gravity of the device without tilting. The body is equipped with adjustable weights to ensure such even rotation. The "center of gravity" is the center of gravity of the rotating portions of the device, which includes the body, the platform, any additional components such as a sundial face and a gnomon, a magnetic north indicator and a magnet, as well as any other optional ornamental components that are attached to or integral with these rotating components. The body can be visually symmetrical, so that (except for a gnomon that may be present in the sundial embodiment) it appears bilaterally symmetrical from all angles; or separate components which have different visual appearances can be located eccentrically with respect to the center of gravity of the rotating parts of the device (as shown in FIG. 6), so long as the body maintains its ability to rotate evenly and horizontally without tilting. In embodiments the platform is positioned directly over the center of gravity of the device. In other embodiments, the platform can be positioned eccentrically with respect to the center of gravity of the device. This allows a great deal of artistic freedom in designing the rotating body of the device. The body can be designed to include three-dimensional landscapes, representations of heavenly bodies, figures of humans, plants and other objects, as well as abstract shapes. In embodiments, the body includes a flat surface fixedly attached thereto that supports the adjustable platform, such as a circular component having a circumference the same as the adjustable platform, wherein the platform can be adjusted to can rotate relative to the fixed flat surface.

The magnet is any magnet known to the art, for example a steel bar magnet, that is strong enough to cause the body and upper components of the device to come to rest with the magnet's magnetic south pole (its north-pointing end) pointing to magnetic north. It is fixedly attached to the body such that rotation of the body causes rotation of the magnet. The attachment can be direct or indirect. For example, the magnet can be fixedly attached indirectly to the body by being directly attached to one or more additional components, such as the magnetic north indicator, that is/are directly fixedly attached to the body. Fixed attachments as referred to herein can be any attachment means known to the art, for example, adhesive, welding, screws or bolts, or, for example, the magnet can be inserted into an attachment means that comprises a chamber in the body from which the magnet will not be dislodged by rotation. The magnet can be composed of one or more separate magnetic pieces.

The magnetic north indicator is fixedly attached to the body and the magnet such that it can be used as a reference point to indicate magnetic north when the magnet is pointing to magnetic north. The magnetic north indicator can be a shaped or marked portion of the south pole of the magnet, or can be a separate component such as pointer on a shaft. The magnetic north indicator can point directly to magnetic north, or in an embodiment, the pointer of the magnetic north indicator is designed to point to a marker or other feature (such as a sundial gnomon) on the platform that can be lined up with magnetic north when the rotation of the body comes to rest.

In an embodiment, in which the magnet is fixedly attached to an inside top surface of the body, the magnetic north indicator can be fixedly attached to an anchor component that is fixedly attached to the top surface of the body (or the anchor component can extend through an opening in the top surface of the body and be fixedly attached to the magnet), and the magnetic north indicator is shaped so that its shaft bends back on itself to allow the pointing end to be positioned above or adjacent to selected markers or other features on the face of the platform. In other embodiments, the magnetic north indicator is fixedly attached to a component that is fixedly attached to the magnet.

The platform can be the same size as a top surface of the body, or can be a different size and shape, larger or smaller. It can be positioned directly above the body, or can be positioned on an arm or other feature extending sideways from the body. It can be positioned vertically above the top or the body or can be positioned to one side of the body.

In the sundial embodiment, the platform comprises a circular sundial face, marked off in degrees, e.g., in 10° or 15° increments and/or in times of day, e.g., 12:00, 1:00, 2:00, etc. or 12:00, 3:00, 6:00, 9:00, or other markings that are readily interpreted as indicating the time of day. Note that time markings on a sundial are positioned differently from those on a clock. The sundial face can be etched, carved, painted, or applied to the top of the platform by any other means known to the art. Any type of sundial known t the art can be applied to the platform so long as it is sized and shaped appropriately to fit without interfering with rotation of the body. One of the markings is selected as a reference marker, such as 0° or 12:00 so that it can be lined up to indicate true north when the device is in use.

In all embodiments, the platform must be adjustably rotatable relative to the magnetic north indicator. "Adjustably rotatable" means that the platform can be adjusted to rotate relative to the magnetic north indicator, and can also be adjusted to rotate with the magnetic north indicator. The platform is positioned relative to the body such that it normally rotates when the body rotates, but can be made to separately rotate relative to the body, such as by the application of force. Advantageously, the amount of force required to separately rotate the platform is no more than can be applied by hand. In embodiments, the platform can be directly rotated by hand. In other embodiments, mechanical advantage can be used to rotate the platform, provided by means such as a screw or gear arrangement or other means known to the art. In further embodiments, the force required can be applied by means of activating a motor that turns the platform, so long as the motor does not interfere with magnetic orientation of the device. Larger devices, e.g., weighing 100 pounds or more, can employ a motor for ease of operation. The platform can be simply set on a top surface of the body when the contacting surfaces of the platform and body have sufficient friction between them to cause the platform to rotate with the body. Or the platform can be screwed to a top surface of the body, and when it is desired to rotate the platform, the screw can be loosened, the platform can be rotated, and the screw again tightened down. As will be appreciated by those skilled in the art, a releasable means, such as clips or other fasteners, can be used to attach the platform to the body. The attachment means for attaching the platform to the body such that it rotates with the body but can also be rotated with respect to the body, include any means known to the art, such as a releasable screw, friction layers between the platform and the body, or other means for releasably fixedly attaching the platform to the body such as releasable clips, pins, screws, or other such components known to the art. In an embodiment, friction layers are placed between the body and the platform whereby the platform rotates with the body when the user spins the body, yet the user can easily rotate the platform with respect to the body by hand in order to adjust a selected reference marker on the platform to be oriented toward true north. In another embodiment releasable clips are used, whereby the platform rotates with the body when the clips are engaged, and can be rotated with respect to the body when the clips are released.

In an embodiment, the device comprises a pedestal fixedly or rotatably attached to the base such that the body rotates with respect to the base. In embodiments, the pedestal and body rotate together; in other embodiments, the base and pedestal remain stationary and the body rotates with respect to both the pedestal and the base. When the pedestal is fixedly attached to the base and rotatably attached to the body, the pedestal can be rotatably attached to the body by means of a pivot rotatably attached to the pedestal and fixedly attached to the body. The body can also can be rotatably attached to the base through a pedestal to which the body is fixedly attached. In this case, the pedestal is rotatably attached to the base, and the pivot can be fixedly attached to the pedestal or to the body, and rotatably attached to the other of the pedestal or the base.

In the sundial embodiment hereof, a gnomon, which casts a sun shadow used to tell the time of day, can be fixedly attached to the face of the sundial aligned with a 12:00 o'clock, 0° or other selected marker on the sundial face. The gnomon itself can serve as the selected marker. The gnomon can be any shape or size consistent with casting a sun shadow that will fall on or near markings on the sundial face indicating the time of day. As is known to the art, however, not all sundials utilize gnomons for casting sun shadows. In some embodiments, such as equatorial sundials, e.g., as described by Sabanski, C., in "The Sundial Primer," available on the worldwide web at: mysundial.ca/tsp/gnomonless_equatorial_sundial. The body should rotate horizontally such that it does not tilt. The rotating components (including the body, platform, magnet, magnetic north indicator, adjustable weights, and other optional ornamental components) are balanced with respect to its center of gravity of the device and may present a radially-symmetrical appearance, or some components may be positioned eccentrically with respect to the center of gravity of the device. In either event, to ensure that the device rotates smoothly without tilting, the adjustable weights, attached to the body through adjustable attachment means, such as screws or rods, nesting grooves for placing weights, or any other means known to the art, can be adjusted so that they are placed to compensate for any unevenness of rotation.

Also provided herein is a method of making a self-orienting platform device as described above comprising: providing the body, magnet, magnetic north indicator, platform, optionally with sundial face and optional gnomon, and adjustable weights; rotatably attaching the body to the base; fixedly attaching the magnet to the body; fixedly attaching the magnetic north indicator to the body; optionally fixedly attaching the sundial face and gnomon, if present, to the platform; and positioning the platform on the body such that the platform rotates with the body but can be adjusted to rotate with respect to the body.

A method for telling the time of day by the sun is also provided herein, using the self-orienting sundial embodiment of the self-orienting platform device as described above. The method comprises: providing a self-orienting sundial as described above and reading the time of day from the position of a sun shadow, cast by a gnomon or other shadow-casting feature, on the face of the self-orienting sundial.

Further, a method is provided for adjusting the self-orienting device such that a selected marker indicates true north, if the selected marker is not already aligned with true north. The method comprises: (a) if the magnetic north indicator is not already positioned with the selected marker pointing toward magnetic north, rotating the platform relative to the body until the magnetic north indicator is aligned with the selected marker; (b) rotating the body, whereby the magnetic north indicator points to magnetic north; (c) if true north is different from magnetic north, adjusting the platform by rotating the platform until the selected marker points to true north. In an embodiment of the self-orienting platform device adapted for use as a sundial with a gnomon, the selected marker can be the gnomon.

"Magnetic north" is the direction a compass points, or the direction the south pole (the "north-pointing" pole) of the magnet hereof points (is closest to) when it comes to rest after the body of the device rotates. "True north" varies depending on the time and place where the device is being used. The difference in degrees between true north and magnetic north can be ascertained by means known to the art, is available on websites such as the National Oceanic and Atmospheric (NOAA) website. The user thus determines a correction factor representing a number of degrees and direction by which true north differs from magnetic north at the current time at the location of the device; and rotates the platform with respect to the body in accordance with the correction factor until the selected marker points to true north. Alternatively, in the Northern hemisphere, the user can adjust the platform so that the selected marker is pointing to true north by a method comprising rotating the platform with respect to the body of the sundial until the selected marker points to the North Star.

Once the self-orienting platform device has been adjusted to compensate for the difference between magnetic north and true north in a given location, it generally does not have to be reset for a long period of time. (Magnetic north shifts with longitude and latitude, and over time in a given location, but shifts slowly enough that unless the sundial is moved a long distance, or several years have passed, the difference is not great enough to make a practical difference.) After the first time the body of the device is spun or the device is repositioned, and then allowed to self-orient, and the platform is rotated until a selected reference marking on the platform is aligned with true north, the body can be spun again and again, and will always reorient itself so that the selected reference marker on the platform aligns with true north. In addition, the device can be carried from place to place locally, set down facing any direction, and after being allowed to self-orient, will again be properly oriented with the reference marker indicating true north.

When the self-orienting platform device is a sundial with a gnomon, it must be oriented with the selected reference marker, such as 0° on the platform, and the gnomon aligned with true north in order to tell time by the sun. As will be appreciated by those skilled in the art, the time shown by the sundial may also need to be interpreted in light of whether or not daylight savings time is in effect. In making this interpretation, the user will need to add an hour to the time shown on the face of the sundial when daylight savings time is in effect. The user may also need to interpret the time shown by the sundial in light of the position of the sundial with respect to the boundaries of the time zone in which it is located. The user will note the difference between the time indicated on the face of the sundial and the actual time at his or her location, and will then add or subtract an appropriate number of minutes to arrive at the correct time.

In addition to the exemplary aspects and embodiments described above, further aspects and embodiments will become apparent by reference to the drawings and by study of the following descriptions.

Exemplary embodiments are illustrated in referenced figures of the drawings. It is intended that the embodiments and figures disclosed herein are to be considered illustrative rather than limiting.

DESCRIPTION

The following embodiments and aspects thereof are described and illustrated in conjunction with systems, tools and methods which are meant to be exemplary and illustrative, not limiting in scope. In various embodiments, one or more of the above-described problems have been reduced or eliminated, while other embodiments are directed to other improvements.

FIG. 1A is a side view of components of the self-orienting platform device hereof, showing base 10, upon which pedestal 20 is fixedly mounted. Pivot 30 pivotally connects pedestal 20 with body 40 (shown in FIG. 2) The components shown in FIG. 1A can be separate components attached to each other by any attachment means known to the art including nails, screws, adhesives, Velcro™, glue, or other such means known to the art. Two or more of these components that are adjacent to each other can also formed together as a single piece, i.e., by molding or by carving.

FIG. 1B is a top view of the device components shown in FIG. 1B. The dimensions and shapes of the components, including their relative sizes, aspect ratios, and proportions, can be other than those shown so long as the base 10 serves the function of stabilizing the rotating components, pedestal 20 serves the function of providing a support and attachment armature for other components of the device as described herein, and pivot 30 allows the body 40 (shown in FIG. 2) to rotate relative to pedestal 20. For example, base 10 and pedestal 20 can be, independently, round, square, oval, triangular, cylindrical, frustoconical, or any other shape in cross-section and/or profile, so long as rotation of the magnetic north indicator (shown in FIG. 2) is not interfered with.

FIG. 2A is a side view of body 40 and associated components of the self-orienting platform device hereof. Body 40 is pivotally attached to pedestal 20 (shown in FIG. 1) so that they rotate with respect to each other. Pivot 30 can be fixedly mounted to the top of pedestal 20 and rotatably attached to body 40, or in an alternative embodiment, can be fixedly mounted on and extending downward from the top of body 40 and rotatably attached to the top of pedestal 20. Adjustable weights 50, evenly spaced on and adjustably attached to, body 40 are useful to contribute momentum when body 40 is spinning relative to pedestal 20 when the device is in use. Adjustable weights 50, can be adjusted closer to or further away from body 40 by means of screws 52, or pegs on which the weights can slide in and out, or other adjustment means known to the art, to ensure that body 40 remains level while spinning. Magnet 60, which in the embodiment shown, is pierced with hole 62 through which pivot 30 (see FIG. 2B) extends when the device is assembled, is fixedly attached to the inside top of body 40 and interacts with the magnetic field of the earth to cause body 40 to orient itself like a compass needle with respect to magnetic north. Magnetic north indicator 65 is fixedly attached to body 40 by means of its fixed attachment to pivot anchor 75 which is fixedly attached to the top of body 40. Magnetic north indicator 65 is equipped with pointer 66, which extends over the top of platform 70 (shown in FIG. 3).

FIG. 2B is a top view of body 40 shown in FIG. 2A, showing magnet 60 fixedly attached to the underside of the top surface of body 40. Anchor 75, fixedly attached to the top of body 40, is also shown. Pivot 30 is fixedly attached to body 40 beneath magnet 60. Also shown are adjustable weights 50 evenly spaced on the circumference of body 40, and adjustably attached thereto by screws 52.

Figure 2:
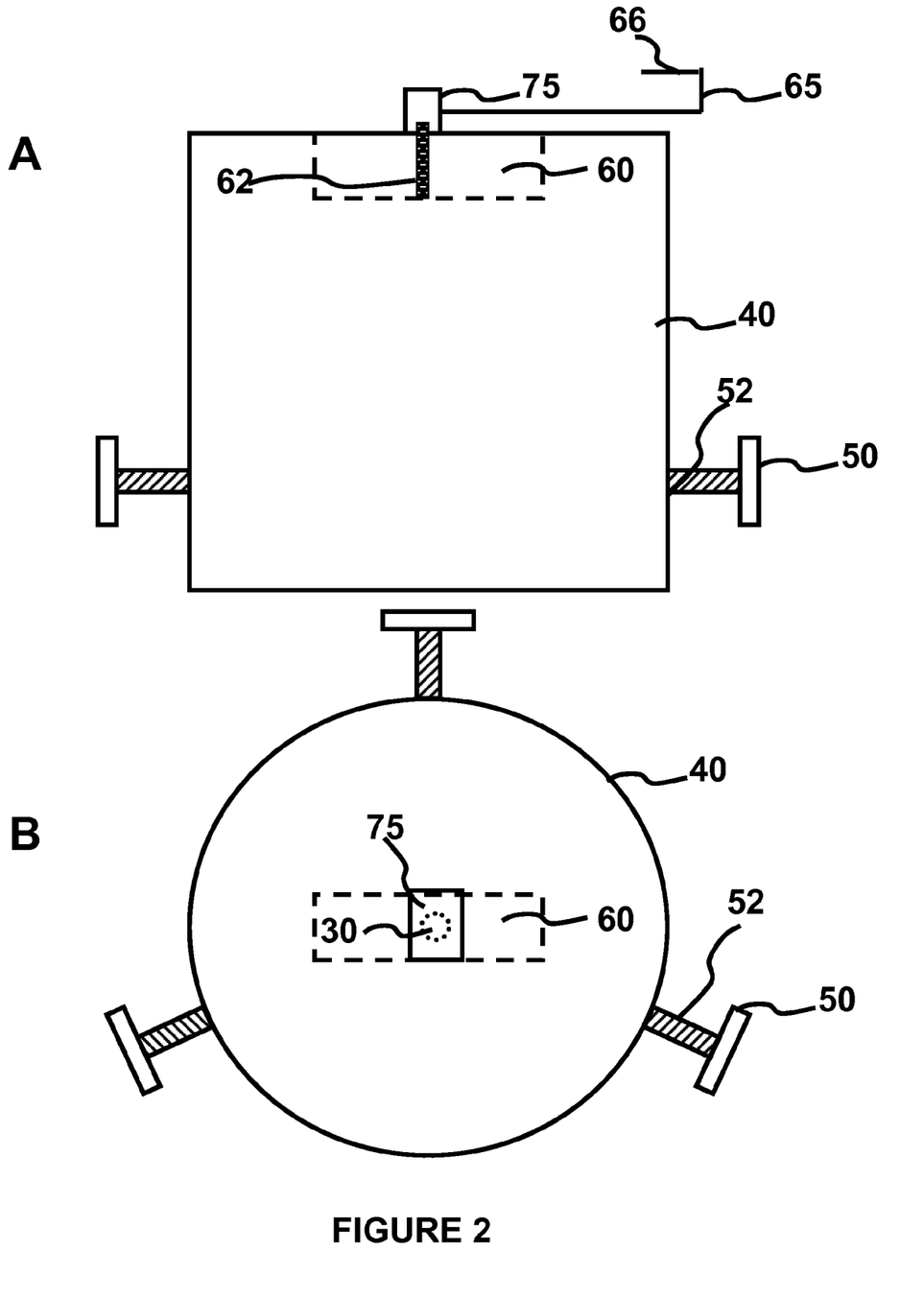
FIG. 2A is a side view of the body portion and associated components of the self-orienting platform device hereof, showing the body, adjustable weights, magnet and magnetic north indicator.
FIG. 2B is a top view of the device shown in FIG. 2A.

FIG. 3A is a top view of adjustable platform 70 of a sundial embodiment of the self-orienting platform device hereof which is frictionally rotationally positioned atop body 40 (shown in FIG. 2). A sundial face 71 is marked on the top of platform 70. Gnomon 80 is fixedly attached to the top of adjustable platform 70 or sundial face 71. Sundial face 71 is marked with circumferential angle marks 72, positioned at intervals, e.g., around its 360° circumference. In embodiments, angle marks 72 indicating angles only up to about 40° or 50° to each side of the 0° point are provided. Markings designated by the numbers 1-12, or other indications of the time of day, can also be placed on sundial face 71, positioned as is known to the art, thus allowing the user to read the time of day from the position of the shadow cast on sundial face 71 by gnomon 80. Gnomon 80 is lined up with the selected marker, e.g. 12:00 o'clock or 0°). Magnetic north indicator 65 attached to anchor 75, and comprising pointer 66 is fixedly attached to anchor 75. Releasable clips 74 are used to attach platform 70 to body 40 such that when the user rotates body 40, platform 70 rotates with it, but the user can release clips 74 to allow platform 70 to rotate with respect to body 40 in order to adjust gnomon 80 and/or the selected reference marker 72 by the amount that true north differs from magnetic north, in order that gnomon 80 and the selected reference marker 72 are aligned with true north as described more fully below.

FIG. 3B is a side view of adjustable platform 70 and gnomon 80 shown in FIG. 3A. Platform 70 is fixedly attached to pivot anchor 75 (which is fixedly attached to body 40 as shown in FIG. 2). Magnetic north indicator 65 is also fixedly attached to pivot anchor 75. Adjustable platform 70 is frictionally rotatably positioned with respect to magnetic north indicator 65 by means of friction layers 90 and 92 shown in FIG. 5, or by other means known to the art. Adjustable platform 70 can be rotated in use so that the 0° marking is aligned with true north, as described below. Of course, it will be appreciated by those skilled in the art that for use as a sundial in the southern hemisphere, the 0° marking must be aligned with true south, gnomon 80 must also be oriented to point toward true south, and time markings must be appropriately adjusted as is known to the art.

Figure 1:
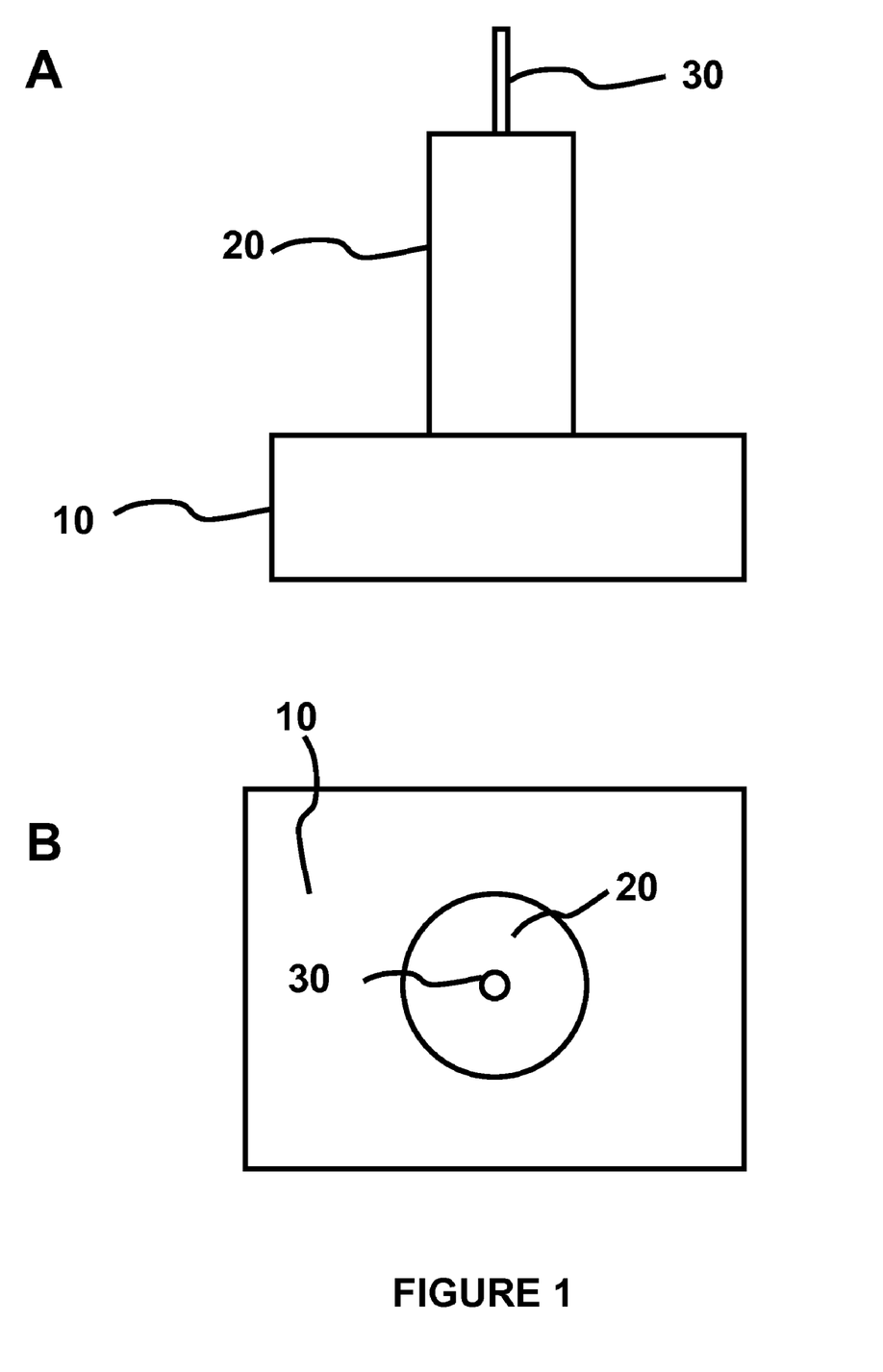
FIG. 1A is a side view of components of a self-orienting platform device hereof, showing the base, pedestal and pivot.
FIG. 1B is a top view of the components shown in FIG. 1B.
Figure 3:
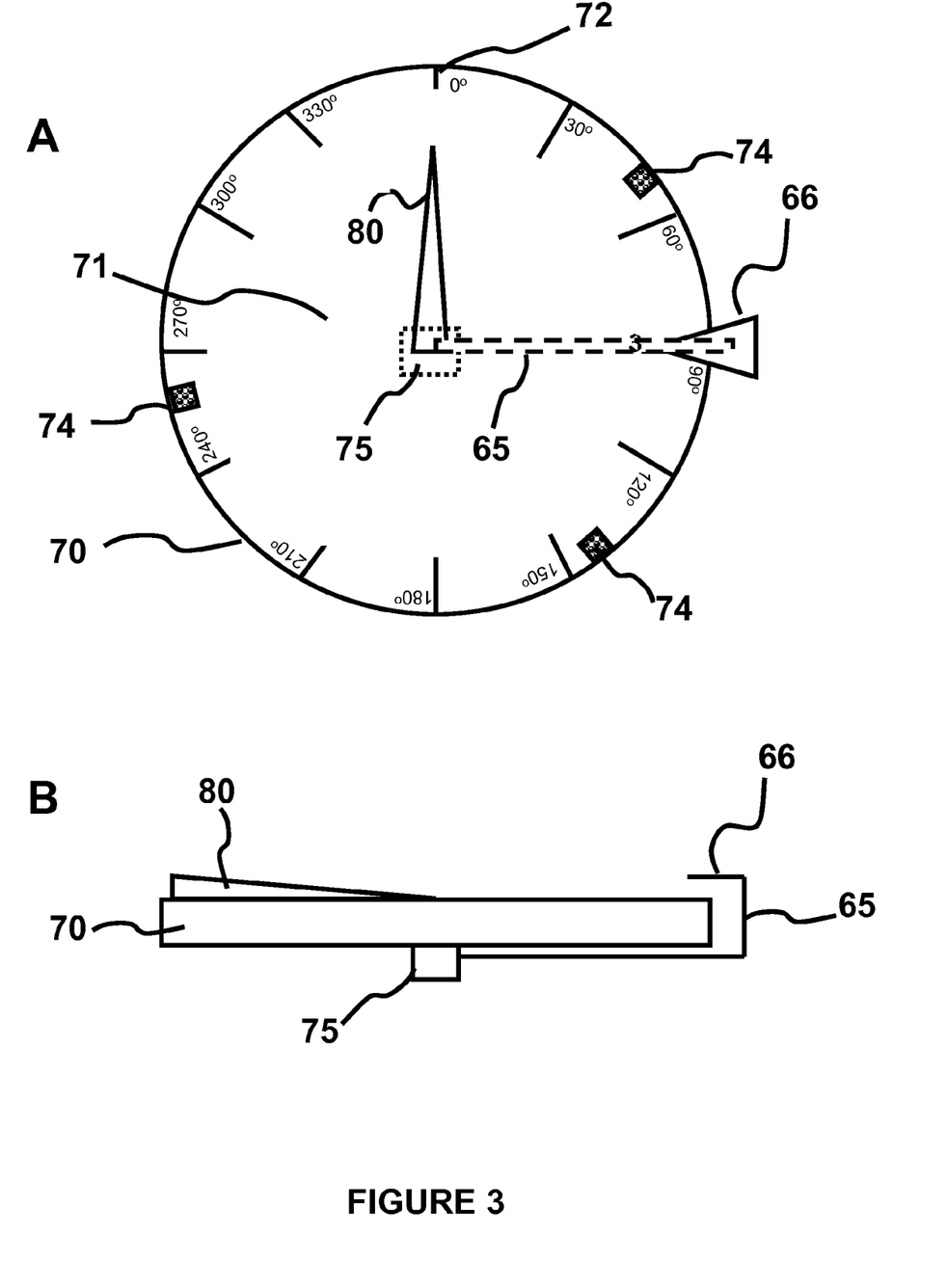
FIG. 3A is a top view of the adjustable platform component of a sundial embodiment of the self-orienting platform device hereof equipped with angle marks and a gnomon.
FIG. 3B is a side view of the platform shown in FIG. 3A disposed on a magnetic north indicator as shown in FIG. 2, and including an anchor and pivot attachment as shown in FIG. 2.
Figure 4:
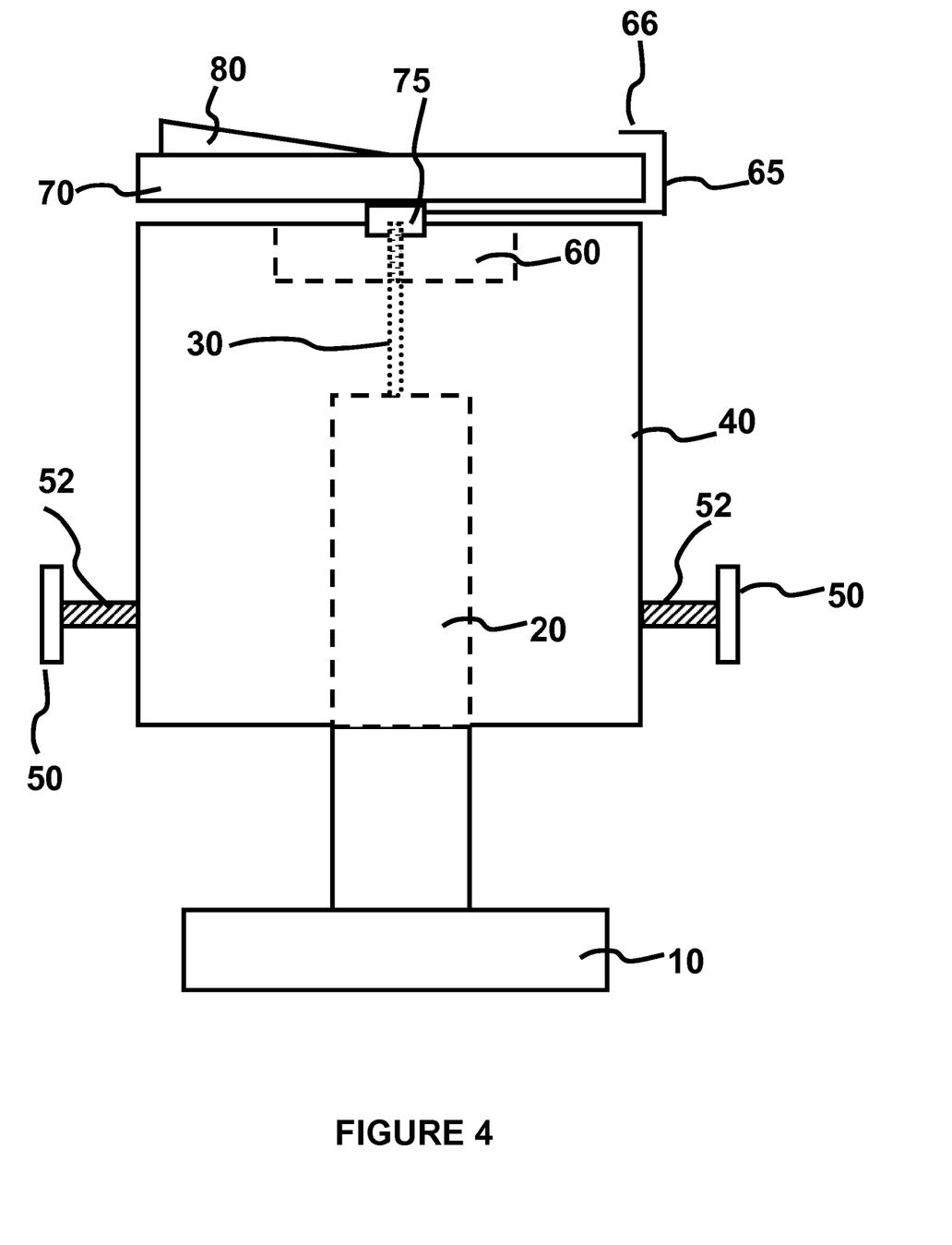
FIG. 4 is a side view of an assembled self-orienting sundial hereof showing components depicted in FIGS. 1-3.

FIG. 4 is a side view of an assembled self-orienting platform device hereof showing components depicted in FIGS. 1-3. In the sundial embodiment depicted here, gnomon 80 is fixedly attached to adjustable platform 70 (or may be integrally formed with adjustable platform 70). Platform 70 is frictionally rotatable with respect to magnetic north indicator 65 and its pointer 66. Pivot anchor 75 is fixedly attached to body 40 and magnet 60, as well as to magnetic north indicator 65. Pivot anchor 75 and body 40 are either fixedly attached to pivot 30 or pivotally attached to pivot 30. If the former, then pivot 30 is pivotally attached to pedestal 20; if the latter then pivot 30 is fixedly attached to pedestal 20. Pedestal 20 is fixedly attached to base 10, or integrally formed therewith as a single piece. Alternatively, pedestal 20 can be pivotally attached to base 10 and fixedly attached to body 40.

Figure 5:
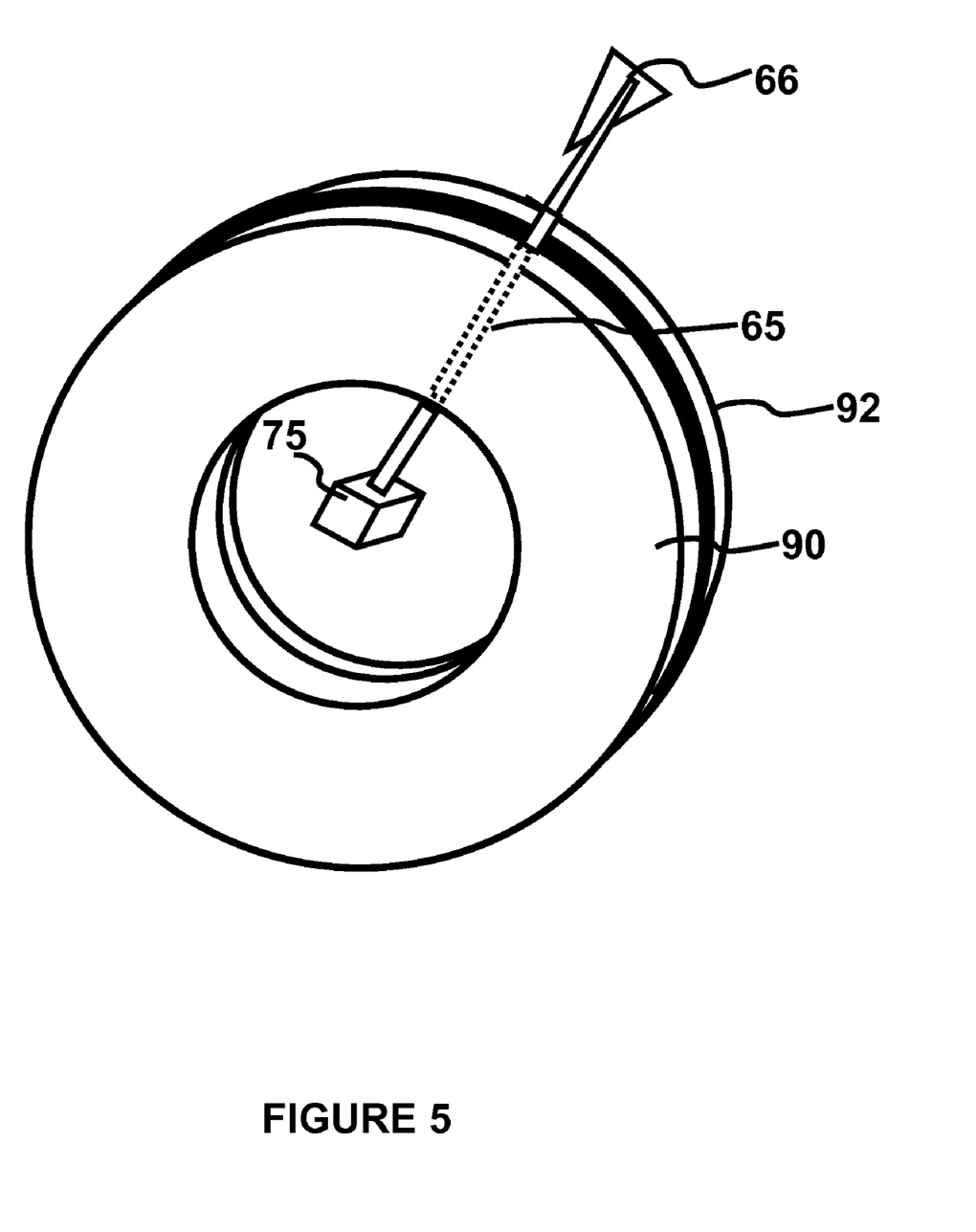
FIG. 5 is a perspective view of the magnetic north indicator of the sundial embodiment shown in FIGS. 3 and 4 sandwiched between two friction layers.

FIG. 5 is a perspective view of magnetic north indicator 65 with its pointer 66, wherein the shaft of magnetic north indicator 65 extends between outward past the circumference of first and second friction layers 90 and 92 and is fixedly attached to pivot anchor 75 and to first friction layer 90 and in frictional contact with second friction layer 92. The bottom of first friction layer 90 is adjacent to and fixedly attached to the top of body 40. Second friction layer 92 is adjacent to and in rotatable frictional contact with adjustable platform 70. In the embodiment shown, first and second friction layers 90 and 92 are separated by a space large enough to accommodate the shaft of magnetic north indicator 65. In other embodiments, first and second friction layers 90 and 92 are integrally formed as a single friction layer, the shaft of magnetic north indicator 65 is fixedly attached to this single friction layer and to pivot anchor 75, and this single friction layer is in frictional contact with the bottom of platform 70. Pivot anchor 75, body 40, magnet 60 and magnetic north indicator 65 are assembled such that these components move together as a unit, and in embodiments can be formed as a single unit. In other embodiments, any two of these components that are adjacent to each other can be formed as a single unit. So long as they move together as a unit, each component does not need to be touching each other component. The fixed attachment of each component to the others may be through an intervening component. The interface between the friction layer(s) and adjustable platform 70 provides sufficient friction so that adjustable platform moves as a unit with pivot anchor 75, body 40, magnet 60 and magnetic north indicator 65 when they are rotated but not so much friction that the user cannot manually rotate adjustable platform 70 relative to these components.

In use, to assemble a sundial embodiment hereof, body 40 is pivotally attached to base 10, directly or through an intervening pedestal 20. Magnetic north indicator 65 with its pointer 66 is fixedly attached to body 40, directly or through pivot anchor 75. Adjustable platform 70, with sundial face 71, its gnomon 80, and angle marks 72 is frictionally rotatably positioned with respect to body 40, e.g., by means of friction layers 90 and 92, such that gnomon 80 and/or a reference marker 72 is aligned with pointer 66 of magnetic north indicator 65.

To orient the platform device or "set" the sundial embodiment hereof to the right time, body 40 is allowed to self-orient, or can be rotated and allowed to come to rest, whereby magnetic north indicator 65 points to magnetic north, by virtue of its fixed attachment to magnet 60. Platform 70 is then rotated so that gnomon 80 and/or selected reference marker 72, e.g. 0°, is aligned with magnetic north indicator 65 and then adjusted as necessary so that the selected reference marker aligns with true north, as described above.

FIG. 6 is a perspective view of an embodiment of the self-orienting platform device hereof in which body 40 is provided in a fanciful configuration including a model of a passenger in the form of spaceman 94. Base 10 supports pedestal 20, to which it is fixedly attached. Body 40 comprises attachment arm 102, vertical platform support 96, and connection piece 100. Fixedly attached to body 40 are spaceman 94, which is fixedly attached to attachment 102 and pivotally attached to pedestal 20, and adjustable weights 50, which are fixedly or adjustably attached to weight shafts 104, which are fixedly or adjustably attached to connection piece 100. Spaceman 94 is fixedly to attachment arm 102, which is adjustably fixedly and rotatably attached to the underside of platform 70, which is fixedly attached to vertical platform support 96, which in turn is rotatably or fixedly attached to connection piece 100, which are in turn fixedly or adjustably attached to weight shafts 104, which are in turn adjustably attached to adjustable weights 50. Where these components are rotatably or adjustably attached, the attachment must be such that in use body 40 and its attached components rotate as a unit when the device is self-orienting, but the components that are rotatably or adjustably attached to each other can be moved relative to each other by the user. Such rotatable or adjustable attachment means are known to the art and/or discussed above with respect to the adjustable rotatable attachment of platform 70 to body 40. Body 40 is rotatably attached to pedestal 20 by means of a pivot 30 (not shown in this figure; see FIG. 3) on the top of pedestal 20, which rotates in a pivot hole 62 (not shown in this figure, see FIG. 2) or by a pivot 30 on the bottom of spaceman 94, which rotates in a pivot hole 62 or other structure known to the art such as a smooth concave surface on the top of pedestal 20. Note that in this embodiment, body 40 is indirectly pivotally attached to pedestal 20 through spaceman 94, which is equipped with a pivot 30 that rotates in a smooth depression in the top of pedestal 20. Magnet 60 is indirectly fixedly attached to body 40 by being directly fixedly attached to spaceman 94 which is directly attached to attachment arm 102, which is directly fixedly attached to body 40. Magnet 60 is also indirectly fixedly attached to magnetic north indicator 65 by being directly attached to attachment arm 102, to which magnetic north indicator 65 is directly attached. Magnetic north indicator 65 is aligned near the outer edge of platform 70.

In use, body 40 can be rotated with respect to base 10. If the rotation of body 40 is not horizontal, adjustable weights 50 can be adjusted to move the center of gravity of body 40 by sliding weights 50 along weight shafts 104 until the body rotates horizontally. The center of gravity of body 40 can be further adjusted by rotating connection piece 100 with respect to vertical platform support 96, and/or by adjusting the position of weight shafts 104 with respect to connection piece 100. Once the center of gravity of the rotating components has been properly adjusted to ensure horizontal rotation of body 40, body 40 is rotated until it comes to a stop with magnets 60 aligned with magnetic north. Magnetic north indicator 65 is then positioned adjacent to a point on the circumference of platform 70 that is closest to magnetic north.

Platform 70 (or in the sundial embodiment, sundial face 71) is marked with at least one reference angle mark 72 (shown in FIG. 3A), or is fixedly attached to a face piece that is marked with a reference angle mark 72. When body 40 stops rotating with respect to base 10, platform 70 should then be rotated, by loosening screw 98 and manually rotating it, until the reference angle mark 72, meant to indicate true north (0° in FIG. 3A) is aligned with magnetic north indicator 65. Finally, the device should be adjusted so that the selected reference marker 72 is aligned with true north. To do this, platform 70 should be rotated by the user by the amount required such that the 0° or other selected reference mark 72 meant to indicate true north is aligned with true north. As is known to the art, true north varies slowly over time with respect to magnetic north and is different in different locations. Information regarding this variation for a particular time and place can be readily be calculated as is known to the art, see, e.g., Wikipedia article entitled "North Magnetic Pole," or the website of the National Oceanic and Atmospheric Administration (NOAA) website (ngdc.noaa.gov/geomagmodels/IGRF.jsp) so that selected reference marker 72 can be aligned with true north.

With respect to the sundial embodiment hereof, as is known to the art, in order to tell time by the sun (without compensating for daylight savings time), sundials must be lined up with the gnomon pointing to true north, such that at 12:00 o'clock the gnomon is aligned with the reference mark 72 selected to indicate true north, e.g., the 0° mark.

Referring to the sundial embodiment hereof, and FIGS. 1-5, if gnomon 80 was not originally lined up with pointer 66 so that the pointer pointed to the 0° reference mark 72 (indicating 12:00 o'clock) on platform 70 (or sundial face 71) prior to rotating the device, the user should manually rotate platform 70 with respect to pointer 66 so that pointer 66 points to angle mark 72 designated 0°. This means gnomon 80 and pointer 66 will now be lined up with magnetic north. In order for gnomon 80 to be lined up with true north, the user should determine the difference between true north and magnetic north at his or her location and time period. Once this has been determined, for example by consulting the NOAA website as described above, the user should manually rotate platform 70 with respect to true north indicator 65 and pointer 66 so that gnomon 80 and the selected reference marker 72 is lined up with true north while magnetic north indicator 65 remains pointed at magnetic north. Magnetic north is always moving, but slowly enough so that the figure obtained for the deviation of true north from magnetic north will be good enough for one to two hundred miles from the user's location and for several years.

For example, the deviation of true north from magnetic north at the time of this writing in Boulder, Colo., is about 9.27°. That is, magnetic north is about 9.27° east of true north. After the device has stopped rotating, in order to line up 0° on the sundial face with true north, when the user is looking down on platform 70 and facing toward magnetic north (indicated by pointer 66), the user rotates platform 70 with respect to pointer 66 in the westward (left) direction 9.27°. The angle mark 72 designated 0° will now be pointing to true north, and if gnomon 80 casts a shadow, the shadow should fall on the marker on the sundial face of platform 70 indicating the correct time of day.

In an alternative method of "setting" the sundial for the correct time, in the northern hemisphere the user can use the North Star. When the North Star is visible, the user rotates the device until it stops with pointer 66 lined up with magnetic north. The user then rotates platform 70 with respect to pointer 66 until gnomon 80 is pointing directly at the North Star, i.e., true north.

After the sundial has been "set" to the right time, it should continue to tell time correctly unless it is moved to a location where magnetic and true north differ by a significantly different deviation. In embodiments, the user may simply wish to rotate the body of the device to enjoy or demonstrate its self-orientating property of stopping when it shows the right time. This can be done repeatedly. The user may wish to carry the device from room to room in a house, or to different outdoor locations, and when this is done can repeat a process described above to set it to the right time.

While a number of exemplary aspects and embodiments have been discussed above, those of skill in the art will recognize certain modifications, permutations, additions and sub-combinations thereof. For example the attachments of components to each other can be direct or indirect, i.e., through other components, so long as the ability or inability of each component to move with respect to the other components is not changed from that described herein. Also, components that are described herein as being fixedly attached to each other can be integrated, such as by being molded or otherwise shaped, as a single part. It is therefore intended that the following appended claims and claims hereafter introduced are interpreted to include all such modifications, permutations, additions and sub-combinations as are within their true spirit and scope.

The invention claimed is:

1. A self-orienting platform device comprising:
   (a) a base;
   (b) a body rotatably attached to said base;
   (c) a magnet fixedly attached to said body;
   (d) one or more weights adjustably attached to said body;
   (e) a magnetic north indicator fixedly attached to said magnet; and
   (f) a platform positioned with respect to said body such that it rotates with said body but can be adjusted so as to rotate relative to said body.

2. The self-orienting platform device of claim 1 wherein the magnetic north indicator is fixedly attached to the magnet indirectly through being directly fixedly attached to the body or another component that is fixedly attached to the body.

3. The self-orienting platform device of claim 1 also comprising:
   a sundial face affixed to the platform; and
   a selected reference marker on the sundial face;
   wherein said self-orienting platform device is a self-orienting sundial.

4. The self-orienting platform device of claim 1 wherein the platform comprising the sundial face is releasably attached to the body, whereby the platform rotates with the body when the attachment means are engaged, and can be rotated relative to the body when the attachment means are released.

5. The self-orienting platform device of claim 3 wherein no separate attachment means are used to attach the platform comprising the sundial face to the body, and the platform can be rotated with the body as a result of friction between the platform and the body.

6. The self-orienting platform device of claim 5 also comprising one or more friction layers between the platform comprising the sundial face and the body, wherein said friction layer(s) provide sufficient friction between the platform and the layer(s) and/or between the body and the layer(s), that the platform rotates with the body, but not so much friction that the platform cannot be rotated relative to the body.

7. The self-orienting platform device of claim 1 also comprising a pedestal fixedly attached to the base.

8. The self-orienting platform device of claim 7 wherein the body is indirectly rotatably attached to the base by being rotatably attached to the pedestal.

9. The self-orienting platform device of claim 1 wherein the body is rotatably attached to the base by means of a pivot rotatably attached to the base and fixedly attached to the body.

10. The self-orienting sundial of platform device 1 wherein the body is rotatably attached to the base by means of a pivot fixedly attached to the base and rotatably attached to the body.

11. The self-orienting platform device of claim 1 which is visually radially symmetrical.

12. The self-orienting platform device of claim 1 having a center of gravity, wherein components attached to the body are eccentrically placed with respect to the center of gravity of the device.

13. A method of making a self-orienting platform device of claim 1 comprising:
   providing the body, magnet, magnetic north indicator, and platform;
   rotatably attaching the body to the base;
   fixedly attaching the magnet to the body;
   fixedly attaching the magnetic north indicator to the body; and
   positioning the platform such that it rotates with the body but can be rotated relative to the body.

14. The method of claim 13 also comprising fixedly attaching a sundial face to the platform.

15. A method for telling the time of day by the sun comprising:
   providing a self-orienting sundial of claim 3; and
   determining the time of day from the position of a sun shadow cast by a sun-casting feature of the sundial on the face of the self-orienting sundial.

16. A method for adjusting a self-orienting platform device of claim 1 so that a selected marker on the platform points to true north, said method comprising:
   (a) if the magnetic north indicator is not already positioned with the selected marker aligned with magnetic north, rotating the platform with respect to the body until the magnetic north indicator is aligned with the selected marker;
   (b) rotating the body with respect to the base, whereby the magnetic north indicator points to magnetic north;
   (c) if true north is different from magnetic north, adjusting the platform so that the selected marker points to true north by rotating the platform with respect to the body of the sundial until the selected marker points to true north.

17. The method of claim 16 comprising:
   determining a correction factor representing a number of degrees and direction by which true north differs from magnetic north at the current time at the location of the self-orienting platform device;
   rotating the platform with respect to the body of the sundial in accordance with said correction factor until the selected marker points to true north.

18. The method of claim 17 comprising determining the correction factor using online information from NOAA.

19. The method of claim 16 comprising rotating the platform with respect to the body until the selected marker points to the North Star.

20. The method of claim 16 wherein the platform device comprises a sundial face and the selected marker is a gnomon fixedly attached to the sundial face.

* * * * *